(12) United States Patent
Eddeane et al.

(10) Patent No.: US 9,167,652 B2
(45) Date of Patent: Oct. 20, 2015

(54) ILLUMINATION DEVICE

(75) Inventors: Redouane Eddeane, Eindhoven (NL);
Robertus Leonardus Tousain, Eindhoven (NL); Bertrand Johan Edward Hontele, Eindhoven (NL);
Dennis Johannes Antonius Claessens, Eindhoven (NL); Etienne Nicolaas Kathalijntje Paulus Marie Eberson, Echt (NL); Hong Jiang, Shanghai (CN);
Philip Louis Zulma Vael, Temse (BE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 212 days.

(21) Appl. No.: 13/496,275

(22) PCT Filed: Sep. 7, 2010

(86) PCT No.: PCT/IB2010/054021
§ 371 (c)(1),
(2), (4) Date: Mar. 15, 2012

(87) PCT Pub. No.: WO2011/033415
PCT Pub. Date: Mar. 24, 2011

(65) Prior Publication Data
US 2012/0169246 A1   Jul. 5, 2012

(30) Foreign Application Priority Data

Sep. 18, 2009  (EP) .................................... 09170633
Nov. 12, 2009  (EP) .................................... 09175776

(51) Int. Cl.
*H05B 37/02*   (2006.01)
*H05B 33/08*   (2006.01)

(52) U.S. Cl.
CPC ............................... *H05B 33/0842* (2013.01)

(58) Field of Classification Search
CPC .......................... H05B 37/02; H05H 33/0842
USPC ......................................... 315/276, 291, 272
See application file for complete search history.

(56) References Cited

U.S. PATENT DOCUMENTS 5,925,990 A *  7/1999  Crouse et al. ................. 315/307
7,659,673 B2 *  2/2010  Lys .............................. 315/247
(Continued)

FOREIGN PATENT DOCUMENTS

CN    201131072 Y    10/2008
JP    2006172820 A   12/2004
(Continued)

OTHER PUBLICATIONS

Halotronic Technical Guide: "Electronic Transformers for Low-Voltage Halogen Lamps", Jan. 2006, Osram, Munich pp. 1-25, pp. 2,4,9, figures 1,7.
(Continued)

*Primary Examiner* — Douglas W Owens
*Assistant Examiner* — Srinivas Sathiraju
(74) *Attorney, Agent, or Firm* — Yuliya Mathis

(57) ABSTRACT

An illumination device (1) comprises: at least one low-power light source (50); a power input stage (20) suitable for receiving AC low voltage from an electronic transformer (ET); a power buffer stage (30) having an input (31) connected to the input stage output (29); a driver (40) for driving the light source and receiving electric power supply from the power buffer stage. The power input stage generates output current pulses for charging the power buffer stage at a relatively low frequency, and during each output current pulse, the power input stage draws input current, the input current always having a current magnitude higher than a minimum load requirement of the electronic transformer.

20 Claims, 5 Drawing Sheets

(56) References Cited

U.S. PATENT DOCUMENTS

| | | | |
|---|---|---|---|
| 7,973,496 B2 * | 7/2011 | Loef et al. | 315/297 |
| 8,106,601 B2 * | 1/2012 | Liu et al. | 315/291 |
| 2003/0031037 A1 | 2/2003 | Piaskowski | |
| 2003/0085749 A1 | 5/2003 | Xu et al. | |
| 2007/0267984 A1 | 11/2007 | Peng | |
| 2008/0018261 A1 * | 1/2008 | Kastner | 315/192 |
| 2008/0088241 A1 | 4/2008 | Chen | |
| 2008/0278092 A1 | 11/2008 | Lys et al. | |
| 2009/0315475 A1 * | 12/2009 | Liu et al. | 315/291 |
| 2010/0320840 A1 * | 12/2010 | Fridberg | 307/52 |
| 2011/0248640 A1 * | 10/2011 | Welten | 315/210 |

FOREIGN PATENT DOCUMENTS

| | | |
|---|---|---|
| JP | 2006032032 A | 7/2006 |
| JP | 2008053188 A | 3/2008 |
| WO | 2009079924 A1 | 7/2009 |

OTHER PUBLICATIONS

Fichera P et al. "Aplication Note: Electronic Transformer for a 12 V Halogen Lamp", 1999, St. Microelectronics, pp. /4-4/4, the whole document, Italy.

* cited by examiner

ILLUMINATION DEVICE

FIELD OF THE INVENTION

The present invention relates in general to the field of lighting.

BACKGROUND OF THE INVENTION

In the field of lighting, many different types of light sources have been developed for illumination purposes. Depending on application, each type of light source may have specific advantages and disadvantages. In any case each type of light source has particular specifications, and power sources (or drivers) for such light sources have been developed for meeting the particular specifications.

A recent development is the high-power LED as light source for illumination purposes. While of course drivers for illumination devices utilizing LEDs as light sources have been and are being developed, there is also a desire to utilize LEDs as replacement for the light sources in existing illumination devices (retrofit), in which case the electrical input signal to the lamp is generated by an existing driver adapted for meeting the particular specifications of the existing (non-LED) light source. This leads to several problems and/or difficulties.

SUMMARY OF THE INVENTION

The present invention is specifically related to the retrofitting problem in the case of low-voltage lamps, such as halogen lamps, for instance the MR16, 12V halogen lamps with GU5.3 fitting pins; alternative examples are the MR11 lamps, or the G4 or G9 pin configurations. However, the principles of the present invention, as far as dimmability are concerned, can also be applies in the case of lamps operated on mains.

In the case of low-voltage lighting systems, the normal mains voltage (typically 230 VAC@50 Hz in Europe) is transformed to a safe low voltage. The majority of the transformers used for this purpose are implemented as electronic, switched-mode power supplies operating at a relatively high switching frequency, higher than the mains frequency, the higher frequency resulting in a smaller transformer size. A problem is that this type of transformer has difficulty in cooperating with LEDs. Typically, the transformer operation may be unstable, resulting in light flicker.

An object of the present invention is to overcome or at least reduce these problems.

Particularly, the present invention aims to improve the compatibility between LEDs and electronic transformers.

More particularly, the present invention aims to provide an illumination device incorporating one or more LEDs as light sources and capable of cooperating reliably with electronic transformers.

The present invention is based on the recognition that an electronic transformer requires a minimum load (minimum output current) in order to operate correctly, and that LEDs may be unable to provide such minimum load. Typically, the minimum load requirement of an electronic transformer is in the range of 20 W to 60 W, whereas LEDs typically provide a much lower load (which low power is actually seen as an important advantage of LEDs, and an important reason for using them to replace higher-power lamps in the first place).

In one important aspect, an LED driver according to the present invention is provided with a power input stage and a power buffer stage. The power input stage is for connecting to a standard electronic transformer, and is designed to draw relatively short, high-level current pulses, i.e. shorter than the mains period. Between these pulses, there is no current drawn from the transformer, so the current transformer may be considered to be OFF. During the pulses, the current level is high enough such as to meet the minimum load requirement of the electronic transformer. The power buffer stage is for buffering the electric power drawn from the electronic transformer. The LED driver itself is powered from the power buffer stage, presenting a relatively low power load to the power buffer stage. On average, the power drawn from the power buffer stage by the LED driver must be compensated by the power drawn from the power input stage by the power buffer stage: this is done by suitably adapting the duty cycle of the high-level current pulses.

Thus, a driver according to the present invention has a two-stage design. The first stage is designed to meet the load requirements of a supply transformer, while the second stage is designed to supply the LED in accordance with the supply requirements of the LED. Further advantageous elaborations are mentioned in the dependent claims.

It is noted that WO2009/079924 discloses a LED driver receiving 12V AC power such as would be provided from a halogen transformer. This driver comprises a rectifier and a buffer capacitor charged by the peak of the 12V AC input voltage. In case of low power consumption by the LED, this driver will also require only low transformer current. In any case, an important disadvantage of prior art solutions is that the peak current into the lamp is undefined and that the peak current drawn from the transformer is undefined, so the current drawn from the transformed can be either too low or to high for the transformer to operate correctly.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, and in which.

DETAILED DESCRIPTION OF THE INVENTION

Figure 1:
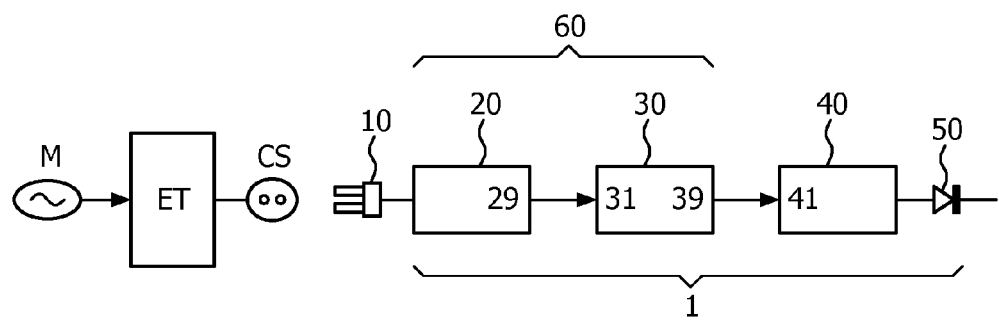
FIG. 1 schematically shows a block diagram of an illumination device implemented in accordance with the present invention.

FIG. 1 schematically shows a block diagram of an illumination device 1 implemented in accordance with the present invention, connected to an electronic transformer ET which in turn is connected to mains M. The illumination device 1 has a three-stage design, comprising a power input stage 20, a power buffer stage 30, an LED driver stage 40 and finally one or more LEDs 50. As will be explained in more detail, the main task of the power input stage 20 is to keep the buffer 30 filled, taking into account the requirements of the supply, especially of the transformer ET, while the main task of the driver 40 is to drive the LED with power taken from the buffer, taking into account the requirements of the LED. Thus, even if such requirements may be mutually conflicting, they do not "collide" since they come into expression in different current circuits. In a steady state, the contents of the power buffer 30 is constant, on average. In one particular implementation, control is determined by the LED circuit: for instance in a case of dimming, the LED power is set, which determines the rate at which the power is taken from the buffer, and the task of the power input stage is to follow this and adapt its buffer filling rate. In another particular implementation, control is determined by the power supply circuit: for instance in a case of dimming, the mains power is set, which determines the rate at which power is inputted into the buffer, and the task of the LED driver stage is to follow this and adapt its buffer depletion rate and hence the LED power.

The LED driver 40 has a power input 41 connected to a power output 39 of the power buffer stage 30. The LED driver 40 may be a standard, autonomous prior art driver without specific adaptations being necessary, so that a further description is omitted here. For instance, any driver capable of operating correctly when its power input 41 is connected to a constant voltage source of suitable voltage level can be used as driver 40.

The power buffer stage 30, which may typically comprise one or more capacitors, has a buffer input 31 connected to a power output 29 of the power input stage 20, which in turn has a power input connected to the electronic transformer ET. As far as architecture is concerned, the illumination device 1 is preferably implemented as a complete lamp unit, including a lamp connector 10 for coupling with a standard connector socket CS connected to a transformer output. However, it is also possible that a standard lamp unit comprised of the combination of lamp 50 and driver 40 is used, this unit being provided with a lamp connector similar to the lamp connector 10 and capable of being coupled to the connector CS, and that the combination of power input stage 20 and power buffer stage 30 is implemented as an intermediate power device 60 provided at its input with a lamp connector similar to the lamp connector 10 and capable of being coupled to the connector CS and provided at its output with a standard connector socket similar to the socket CS.

Figure 2:
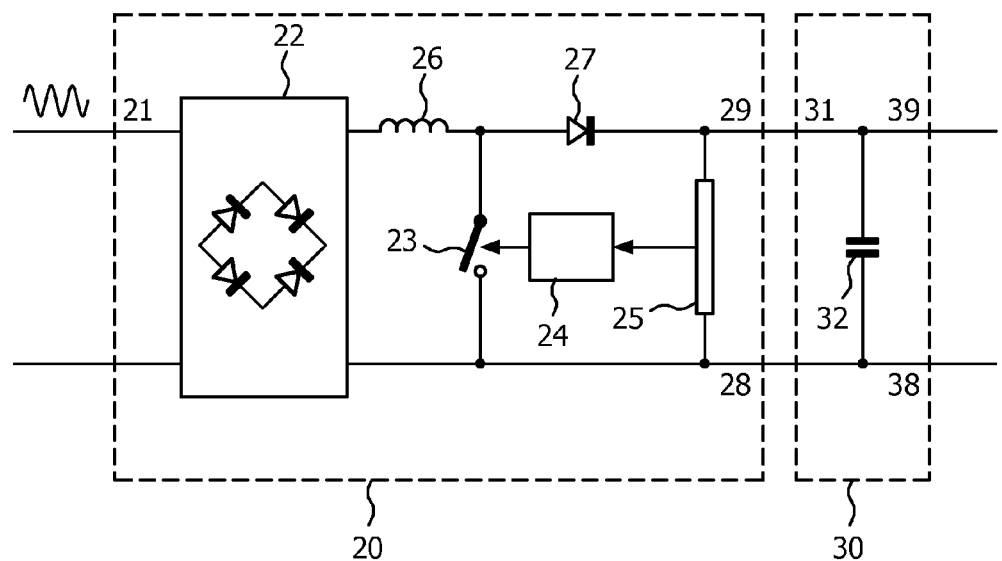
FIG. 2 is a schematic block diagram illustrating a power input stage and a power buffer stage.

FIG. 2 is a schematic block diagram illustrating some aspects of the power input stage 20 and the power buffer stage 30 in some more detail.

The power buffer stage 30 typically comprises a capacitor 32, connected parallel to output terminals 38, 39.

The power input stage 20, which may comprise a rectifier 22, is preferably implemented as a converter. FIG. 2 illustrates a boost converter design, but the power input stage 20 may also be implemented as a buck-boost converter, a SEPIC converter, etc; in all of these implementations, it is possible to obtain an output voltage (and thus operating voltage of the power buffer stage 30) higher than the output voltage of the transformer ET. In the embodiment shown, the power input stage 20 comprises a series arrangement of an inductor 26 and a diode 27 connected between input 21 (or rectifier 22) and output 29. A controllable switch 23 is connected in parallel to the output terminals 28, 29, at the node between inductor 26 and diode 27. The controllable switch 23 is controlled by a control device 24 to be either conductive (ON) or non-conductive (OFF).

The operation is as follows. When the switch 23 is ON, the transformer provides a current of increasing magnitude that is used to charge the inductor 26. When the switch 23 is OFF, the inductor 26 provides to the capacitor 32 a current of decreasing magnitude, causing a transfer of energy from the inductor 26 to the capacitor.

Figure 3:
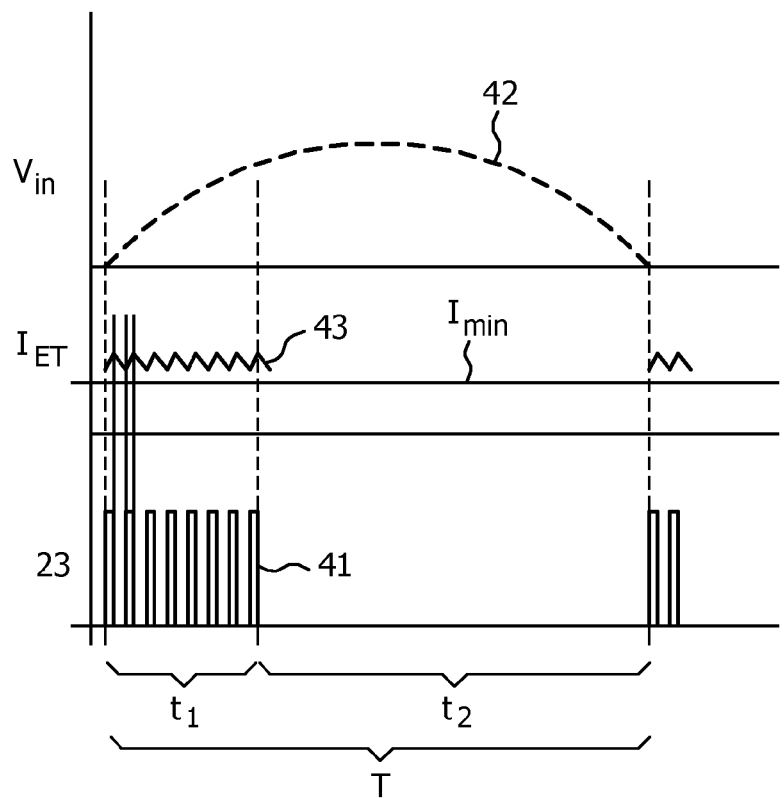
FIG. 3 is a graph schematically illustrating several waveforms of current and voltage.

The operation of the device will be explained in more detail with reference to FIG. 3, which is a graph showing the waveform of some signals. The control device 24 switches the switch 23 at a relatively high frequency (FIG. 3, curve 41). As should be clear to a person skilled in the art, the output voltage that is achieved depends on the duty cycle of this HF switching. FIG. 3 also shows the output voltage of the transformer ET i.e. input voltage $V_{in}$ for the power input stage 20 (curve 42). The current $I_{ET}$ drawn from the transformer (curve 43) is typically proportional to the current in the inductor 26, unless a filter capacitor is used at the input 21, in which case the ripple in the inductor current would be smoothened in the transformer current. The control device can be set to allow the output current to be proportional to the input voltage, but it is also possible that the control device is set to keep the output current constant (albeit perhaps with some degree of HF ripple).

The control device 24 is designed, at a relatively low frequency, to alternate between a switching mode and an OFF mode, i.e. to alternate periods of HF switching with periods during which no switching occurs and the switch 23 remains OFF. The control device 24 stays in its switching mode for a first duration t1 and stays in its OFF mode for a second duration t2, so that the overall switching period T=t1=t2. A duty cycle D for this LF switching is defined as t1/T.

As far as the transformer ET is concerned, it is loaded at the duty cycle D, i.e. it alternates between periods in which it is loaded (t1) and periods in which it is not loaded (t2). During the periods in which it is loaded (t1), the transformer ET provides relatively high current having a magnitude $I_{ET}$ always higher than a minimum load requirement $I_{min}$ of the electronic transformer. In this respect it is noted that different types of transformers may have different values for the minimum load requirement. The illumination device 1 may be designed for cooperation with a specific type of transformer, taking into account the known minimum load requirement associated with this specific transformer type, but it is also possible that the illumination device 1 is designed for cooperation with a plurality of types of transformer, in which case the illumination device 1 may take into account the highest value of the collection of known minimum load requirements associated with the different transformer types.

As mentioned above, the power input stage 20 is loaded by the buffer stage. Assume that the LED power is determined in the LED driving circuit. This may for instance be because the LED driver 40 has a user input (not shown) for allowing the user to dim the LED 50, or because different specimens and/or types of LEDs have different current requirements under full power conditions. As far as the LED driver 40 is concerned, the buffer 30 acts as constant voltage source, and the driver operates autonomously as normal. It is noted that the LED driver 40 itself may execute a duty cycle operation to vary the intensity of the light output of the LED (dimming). Thus, it may be that the power required by the driver 40 varies. The LED driver 40 thus determines the power output rate for the buffer 30. Particularly when the LED is operated in a dimmed state, the average power consumed by the LED is low, and thus the average power taken from the buffer 30 is low. The power input stage 20 has to compensate this by adapting its power output, i.e. the power input rate for the buffer 30. A criterium for a correct setting is that the buffer contents is kept constant, on average. This can be assessed by measuring the buffer voltage. To this end, in this embodiment, the power input stage 20 may further comprise a voltage sensor 25 measuring the output voltage of the power input stage 20, which substantially corresponds to the voltage over the capacitor 32. Alternatively, it is also possible that the power buffer stage 30 comprises an output voltage sensor feeding a measuring signal back to the power input stage 20. In any case, the control device 24, which may for instance be implemented as a suitably programmed microprocessor, controls the timing of the switch 23 such as to keep the measured voltage substantially constant, at least on average on a sufficiently large time scale, as should be clear to a person skilled in the art.

Thus, the control device 24 adapts its duty cycle D such as to maintain the voltage at buffer 30, which means that the average power taken from the transformer ET follows the average power consumed by the LED. It is to be noted that, as such, the switching frequencies of driver 40 and control device 24, and the duty cycles applied in driver 40 and control device 24, are mutually independent: the current behavior at the input side is separated from the current behavior at the output side.

It is noted that the control device may apply different control schemes for alternating between the switching mode and the OFF mode. For instance, it is possible that the control device 24 makes a decision on switching its mode on the basis of the output voltage sensor 25 only: the control device 24 enters the switching mode when the control device 24 finds that the output voltage has dropped below a certain predefined first threshold and enters the OFF mode when the control device 24 finds that the output voltage has reached a certain predefined second threshold higher than the first threshold; in such case, the overall switching period T will vary. However, it is preferred that the control device 24 operates in synchronization with the output voltage of the transformer ET, as shown: the control device 24 enters the switching mode at a first value of the phase, for instance at the zero-crossings, and enters the OFF mode when the output voltage has reached a certain predefined threshold; in such case, the overall switching period T will be constant. It is possible that the control device 24 enters the switching mode two or more times during the period of the input voltage, but it is preferred that the control device 24 enters the switching mode only once during the period (or during half the period) of the input voltage.

Figure 4:
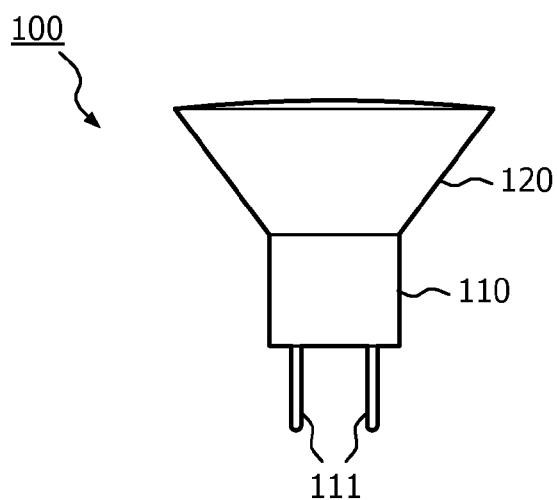
FIG. 4 schematically illustrates a LED lamp according to the present invention.

FIG. 4 schematically illustrates a preferred physical implementation of a lamp unit 100 according to the present invention, comprising a first housing part 110 housing the driver electronics circuitry 20, 30, 40 and carrying connection pins 111 for connection to a socket, and a second housing part accommodating one or more LEDs.

Figure 5:
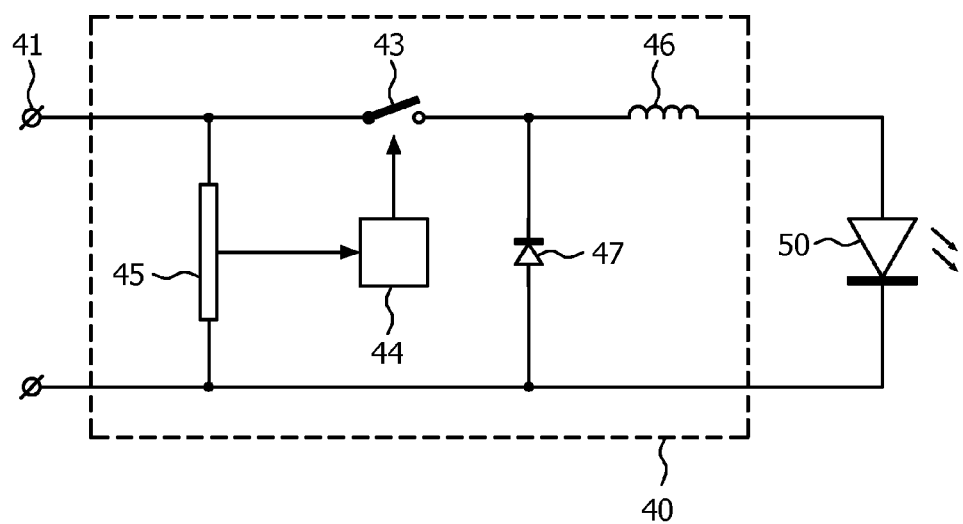
FIG. 5 is a schematic block diagram illustrating a LED driver.

In the explanation above, it was assumed that the mains M and the electronic transformer ET provide a fixed power, and that the LED 50 is dimmed by the LED driver 40. In such case, when a user controls the LED driver 40 to reduce the power consumption of the LED 50 and hence reduces the power required by the LED driver 40, the control in the power input stage 20 controls the power drawn by the power input stage 20 from the power supply so that the input power of the illumination device is adapted to the output power of the illumination device. In an equilibrium condition, the average amount of power transferred from the power input stage 20 to the power buffer stage 30 is equal to the average amount of power transferred from the power buffer stage 30 to the LED driver 40. However, it is also possible to use a dimmable power source, which is known per se, so that the LED power is determined by setting the mains power. In contrast to the previous embodiment, the power input rate for the buffer 30 is leading, being directed by the power supply. Particularly when the power supply is operated in a dimmed state, the average power inputted into the buffer 30 is low. The LED driver 40 has to compensate this by adapting the power it drains from the buffer, and consequently adapting its power output. This means that the LED output power is to be adapted to the power provided at the input. A criterium for a correct setting is that the buffer contents is kept constant, on average. This can be assessed by measuring the buffer voltage. FIG. 5 is a schematic block diagram schematically illustrating an embodiment of the LED driver 40 providing a relatively simple solution to this desire.

In this embodiment, a voltage sensor 45 may be connected across the input 41, thus sensing input voltage of the driver 40, which substantially corresponds to the output voltage of the power buffer stage 30. Alternatively, it is also possible that the power buffer stage 30 comprises an output voltage sensor feeding a measuring signal forward to the driver 40.

FIG. 5 illustrates the LED driver 40 as a buck converter, but other designs are also possible. In the embodiment shown, the LED driver 40 comprises a series arrangement of a controllable switch 43 and an inductor 46 connected between input 41 and LED 50. A diode 47 is connected in parallel to the LED 50, at the node between switch 43 and inductor 46. The controllable switch 43 is controlled by a control device 44, which may for instance be implemented as a suitably programmed microprocessor, to be either conductive (ON) or non-conductive (OFF). The voltage sensor 45 generates a measuring signal for the control device 44, which controls the timing of the switch 43 such as to keep the measured voltage substantially constant, at least on average on a sufficiently large time scale, as should be clear to a person skilled in the art. Since buck converters are commonly known, a detailed description of its functioning is omitted here. Suffice it to say that the power taken from the power buffer stage 30 depends on the duty cycle at which the controllable switch 43 is switched, and that this duty cycle also determines the average LED current and hence the average power inputted into the LED. In an equilibrium state, when the duty cycle is correctly set such that the output voltage of the power buffer stage 30 as measured by the voltage sensor 45 is constant, the power taken from the power buffer stage 30 is equal to the amount of power provided by the power input stage 20 and the amount of power inputted into the LED is equal to (if there are no losses) or at least proportional to the amount of power provided by the dimmed power supply M, ET. Effectively, the LED 50 is dimmed through mains dimming.

With respect to the control device 44, it is noted that several implementations are possible. The output voltage of the power buffer stage 30 has some high-frequency ripple, so the control device 44 may be provided with a filter for filtering this ripple and for providing an average version of the buffer stage output voltage. It is also possible that the control device 44 specifically maintains the minimum peaks or the maximum peaks of the buffer stage output voltage constant. The controller itself can be any type of P, PI, PID or other linear filter controller, or a nonlinear controller. In the most preferred implementation, the controller is a nonlinear gain controller with a low gain when the buffer voltage is close to setpoint and a high gain when the buffer voltage is far away from setpoint. The latter occurs when the dimmer knob is turned fastly in which case a fast response of the control loop is required.

Figure 6A:
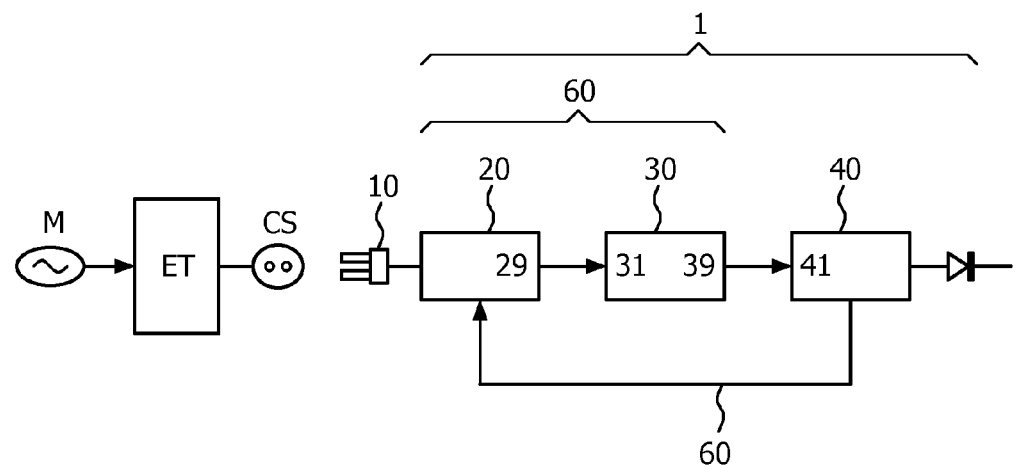
FIGS. 6A-6C are schematic block diagrams illustrating a variation of the illumination device of FIG. 1.
Figure 6B:
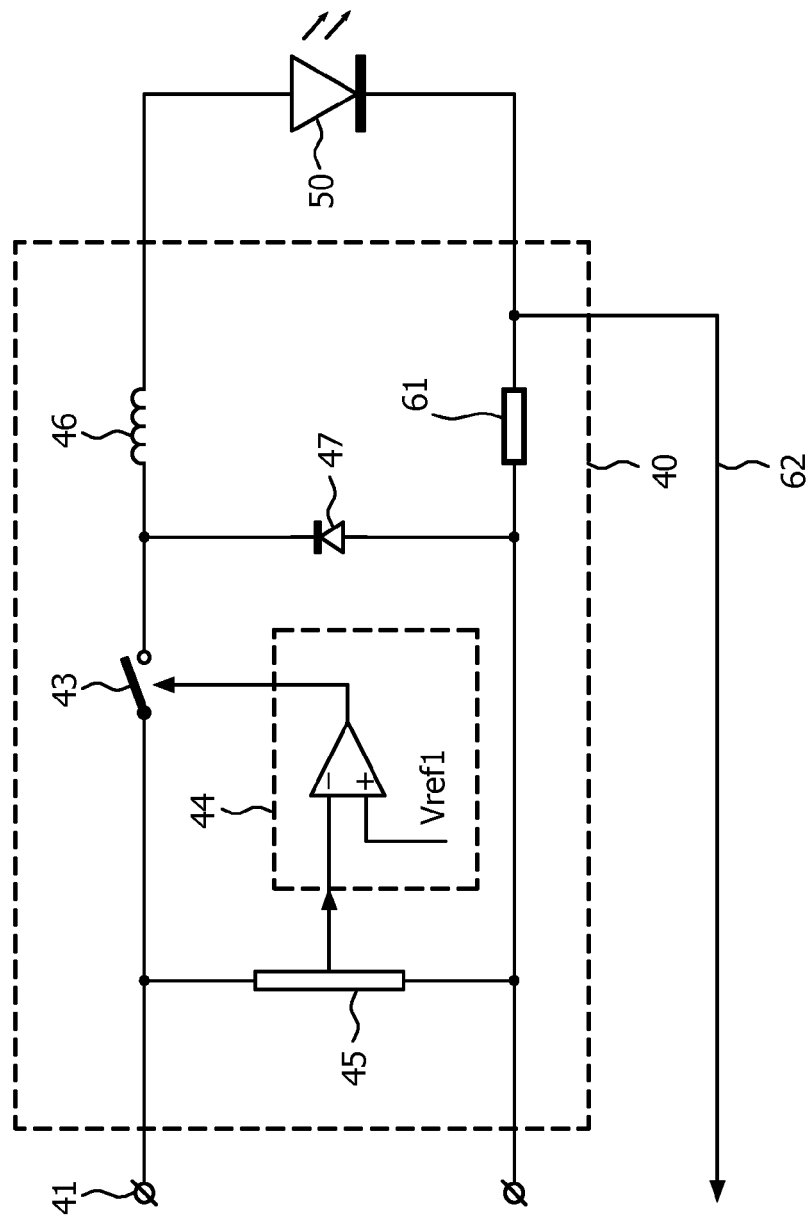
Figure 6C:
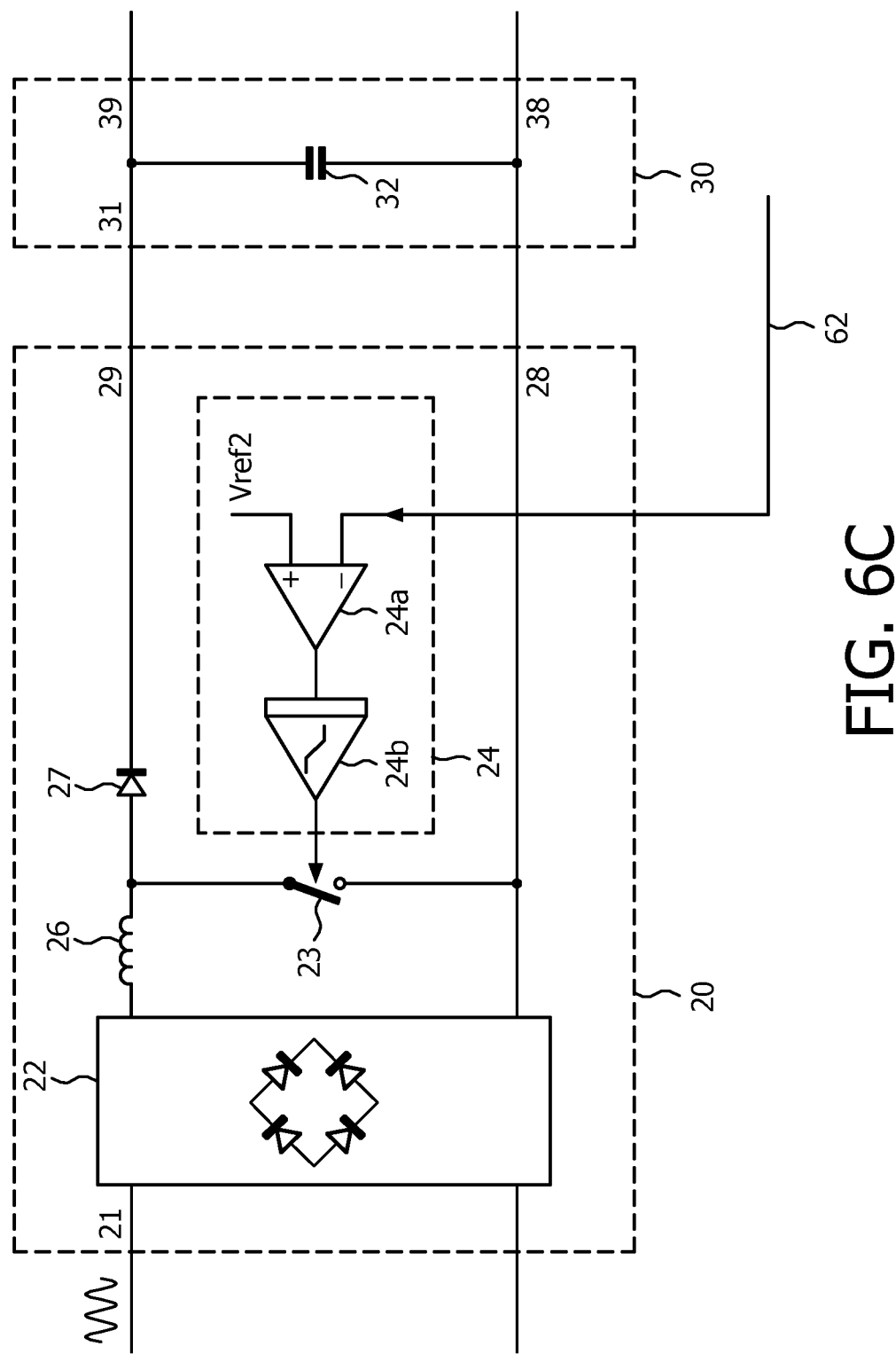

FIG. 6A is a schematic block diagram, comparable to FIG. 1, schematically illustrating a further elaboration of the illumination device 1, which is specifically useful in combination with the embodiment discussed with reference to FIG. 5. FIG. 6B is a schematic block diagram, comparable to FIG. 5, showing more details of the LED driver 40 in this embodiment, while FIG. 6C is a schematic block diagram, comparable to FIG. 2, showing more details of the power input stage 20 in this embodiment.

It is noted that FIG. 6B shows the driver design of FIG. 5, but that is not essential. The figure shows that the control device 44 may comprise a differential amplifier receiving a first reference voltage Vref1 at a non-inverting input and receiving the output signal from the voltage sensor 45 at an inverting input. Control of the switch 43 will be such that (on average) the sensed voltage will be equal to the reference voltage, hence the buffer voltage will be constant. In this embodiment of FIGS. 6A-C, the illumination device 1 comprises a feedback loop 60 feeding back a signal representing the LED current to the power input stage 20. As shown in FIG. 6B, the feedback loop 60 to this end includes a current sensor 61, arranged for sensing the LED output current of the LED driver 40, and providing a sensor output signal to a sense line 62. As shown in FIG. 6C, the sense line 62 is connected to an input of the control device 24.

The control device 24 is adapted to control the switch 23 in such a manner that the average input current of the power input stage 20, drawn from the supply (i.e. electronic transformer ET) is substantially constant. The setpoint for this current is predefined, stored in a memory component of the control device 24, based on considerations relating to nominal operating conditions of the LED (or LED array) 50 for which the device 1 is designed. If the LED is not dimmed, the LED is operating at nominal operating conditions which can also be termed "full power". In this "full power" condition, the LED 50 requires a certain nominal LED current and consumes a certain nominal power. Assuming, for sake of simplicity, that there are no losses, this nominal LED power should, in equilibrium, be equal to the (average) input power taken by the power input stage 20 from the power supply. However, while the control device 24 can determine the input current of the power input stage 20, the input voltage is determined by the output voltage of the supply (i.e. electronic transformer ET). In practice, the output voltages of individual specimens of such supplies, even when they are of the same type, may range within certain tolerances, and may even vary with time and/or operating conditions such as temperature. Consequently, the input power may be supply-dependent, within a certain tolerance range. Without the feedback loop 60, this could easily translate to variations of the LED power, especially in an embodiment such as illustrated in FIG. 5. In the embodiment of FIGS. 6A-6C, the control device 24 can compensate for such tolerances of the power supply by setting an operational setpoint for the average input current of the power input stage 20 on the basis of the measured LED current, such that the LED current remains constant (equal to a reference value stored in a memory component of the control device 24). In other words, disregarding losses, the input current is adapted to the input voltage such that the input power is equal to the output power. In FIG. 6C, the control device 24 is illustratively shown as comprising a differential amplifier 24a receiving sense line 62 at its inverting input. Said setpoint is represented as a reference signal Vref2 coupled to the amplifier's non-inverting input. Disregarding block 24b, which will be discussed later, control of the switch 23 will be such that (on average) the sensed current will be equal to the setpoint as represented by Vref2.

It should be clear that the effect is that the LED output is independent from the average power supply voltage, even if the supply power would be dimmed. This is no problem in cases where dimmability is not an issue. In order to combine the advantage of tolerance compensation with the advantage of dimmability, the control device 24 can be designed to have a limited range of freedom for setting the operational setpoint for the average input current, for instance between plus and minus 10% of the predefined fixed setpoint. As a result, deliberate dimming by the power supply would be "obeyed" by the LED, with a "delay" depending on said range. For instance, assume that, in the full power condition, an electronic transformer ET provides an output voltage 5% higher than the nominal design value. The control device 24 compensates this by lowering the input current setpoint by 5% with respect to the predefined fixed setpoint. Assume now that the electronic transformer ET is dimmed. The control device 24 responds by increasing the input current setpoint so that the LED output remains constant. When the electronic transformer ET is dimmed by 15%, the input current setpoint is 10% higher than the predefined fixed setpoint. Only when the electronic transformer ET is dimmed further, the input current setpoint is maintained constant (at 10% higher than the predefined fixed setpoint) and the LED output power reduces.

Summarizing, the present invention provides an illumination device 1, comprising:

at least one low-power light source 50;

a power input stage 20 suitable for receiving AC low voltage from an electronic transformer ET;

a power buffer stage 30 having an input 31 connected to the input stage output 29;

a driver 40 for driving the light source and receiving electric power supply from the power buffer stage.

The power input stage generates output current pulses for charging the power buffer stage at a relatively low frequency, and during each output current pulse, the power input stage draws input current, the input current always having a current magnitude higher than a minimum load requirement of the electronic transformer.

While the invention has been illustrated and described in detail in the drawings and foregoing description, it should be clear to a person skilled in the art that such illustration and description are to be considered illustrative or exemplary and not restrictive. The invention is not limited to the disclosed embodiments; rather, several variations and modifications are possible within the protective scope of the invention as defined in the appending claims.

For instance, the power input stage 20 and the power buffer stage 30 may be integrated into one unit.

Further, it is possible to have an embodiment in which the control mechanism of FIGS. 5 and 6 as well as the control mechanism of FIG. 3 are implemented, while during operation one mechanism may obtain higher priority than the other, for instance by a user-selection.

Further, while the invention has been described for the case of LEDs, the principles of the present invention are also useful when powering any low-power light source from a low-voltage transformer.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, digital signal processor, etc.

The invention claimed is:

1. An apparatus, comprising:
   at least one light source;
   a power input stage having an input configured to receive an AC voltage and further having an output, the power input stage including a switched mode converter which is configured to supply an output current to the output in response to the received AC voltage;
   a power buffer stage connected to the output of the power input stage to receive the output current of the switched mode converter and being configured to supply an output voltage; and
   a driver configured to drive the light source, the driver having an input connected to the power buffer stage to receive the output voltage from the power buffer stage,
   wherein the power input stage is configured to alternate, at a first frequency, between a current generating mode for generating the output current to charge the power buffer stage and an OFF mode during which no output current is generated,
   wherein the power input stage is further configured to switch the switched mode converter at a second frequency which is greater than the first frequency while the power input stage is in the current generating mode, wherein a level of the output voltage of the power buffer stage is determined by the second frequency, and wherein the first frequency is controlled to maintain the output voltage of the power buffer stage to be on average substantially constant, and
   wherein, in the current generating mode, the power input stage is configured to draw an input current always having a current magnitude higher than a minimum threshold value which is greater than zero.

2. The apparatus of claim 1, wherein the at least one light source comprises an LED.

3. The apparatus of claim 1, wherein the driver is configured to drive the light source with a constant current and to dim the light source by varying the magnitude of the constant current.

4. The apparatus of claim 1, wherein the power input stage comprises a boost converter, or buck-boost converter, or SEPIC converter.

5. The apparatus of claim 1, wherein the power input stage is configured to switch from the current generating mode to the OFF mode and/or from the OFF mode to the current generating mode in synchronization with the received AC voltage.

6. The apparatus of claim 1, wherein the power input stage further is provided with a sensor configured to measure the output voltage of the power buffer stage, and wherein the power input stage is configured to switch from the current generating mode to the OFF mode and/or from the OFF mode to the current generating mode in response to the measuring signal from the sensor.

7. The apparatus of claim 6, further comprising a control device configured to control the first frequency to keep the measured output voltage of the power buffer stage on average substantially constant, and further configured to control the second frequency to set the level of the output voltage of the power buffer stage.

8. The apparatus of claim 1, wherein the driver comprises current control means configured for controlling a current flowing through the light source in such a manner that the output voltage of the buffer stage remains substantially constant.

9. The apparatus of claim 8, further comprising a current feedback loop configured to feed back to the power input stage a feedback signal indicating the current flowing through the light source, the power input stage comprising input current control means configured to receive said feedback signal and configured to control the input current of the power input stage in such a manner that the current flowing through the light source is independent from variations in a voltage level of the AC voltage.

10. The apparatus of claim 9, wherein said input current control means is configured for compensating for the variations in the voltage level of the AC voltage within a predefined range of tolerances.

11. The apparatus of claim 1, wherein the power buffer stage comprises at least one capacitor.

12. The apparatus of claim 1, wherein the driver is configured to generate pulsed lamp current having current pulses of the same magnitude as each other, and for dimming the light source by varying a duty cycle of the current pulses.

13. The apparatus of claim 1, further comprising an electronic transformer having a minimum load requirement which is connected to supply the AC voltage to the input of the power input stage, wherein the power input stage is configured in the current generating mode to draw an input current always having a current magnitude higher than the minimum load requirement of the electronic transformer.

14. A method, comprising:
   receiving at an input of a power input stage an AC voltage from an electronic transformer having a minimum load requirement, the power input stage including a switched mode converter which supplies an output current in response to the received AC voltage;
   providing the output current of the switched mode converter to a power buffer stage;
   providing an output voltage from the power buffer stage to a driver which is configured to drive a light source;
   controlling the power input stage to alternate, at a first frequency, between a current generating mode for generating the output current to charge the power buffer stage and an OFF mode during which no output current is generated, including controlling the power input stage in the current generating mode to draw an input current always having a current magnitude higher than the minimum load requirement of the electronic transformer;
   switching the switched mode converter at a second frequency which is greater than the first frequency, while the power input stage is in the current generating mode; and
   controlling the second frequency to set a level of the output voltage of the power buffer stage, and controlling the first frequency to maintain the output voltage of the power buffer stage to be on average substantially constant.

15. The method of claim 14, further comprising controlling a current flowing through the light source to have a constant magnitude which is independent from variations in a voltage level of the AC voltage.

16. The method of claim 15, further comprising dimming the light source by varying the magnitude of the current flowing through the light source.

17. An apparatus, comprising:
at least one light emitting diode (LED);
a power input stage having an input receiving an AC voltage and further having an output, the power input stage including a switched mode converter which supplies an output current to the output in response to the received AC voltage;
a power buffer stage connected to the output of the power input stage to receive the output current of the switched mode converter and to supply an output voltage;
a driver for driving the at least one LED, the driver having an input connected to the power buffer stage to receive the output voltage from the power buffer stage; and
a control device which controls the power input stage to alternate, at a first frequency, between a current generating mode for generating the output current to charge the power buffer stage and an OFF mode during which no output current is generated, wherein the control device controls the first frequency to maintain the output voltage of the power buffer stage to be on average substantially constant, the control device further controlling the switched mode converter to switch at a second frequency which is greater than the first frequency while the power input stage is in the current generating mode, wherein the control device controls the second frequency to set the output voltage of the power buffer stage to a particular level, and wherein the control device controls the power input stage in the current generating mode to draw an input current always having a current magnitude greater than a minimum threshold value which is greater than zero.

18. The apparatus of claim 17, further comprising an electronic transformer having a minimum load requirement which is connected to supply the AC voltage to the input of the power input stage, wherein the power input stage is configured in the current generating mode to draw an input current always having a current magnitude higher than the minimum load requirement of the electronic transformer.

19. The apparatus of claim 17, wherein the driver generates from the output voltage of the power buffer stage a pulsed lamp current having current pulses of the same magnitude as each other and supplies the lamp current to the at least one LED.

20. The apparatus of claim 19, wherein the driver dims the at least one LED by varying a duty cycle of the current pulses.

* * * * *